US012458848B2

(12) United States Patent
Finch

(10) Patent No.: US 12,458,848 B2
(45) Date of Patent: Nov. 4, 2025

(54) PICKLEBALL HAVING NOISE DAMPENING CHARACTERISTICS

(71) Applicant: Paul Finch, Brighton, MI (US)

(72) Inventor: Paul Finch, Brighton, MI (US)

(*) Notice: Subject to any disclaimer, the term of this patent is extended or adjusted under 35 U.S.C. 154(b) by 0 days.

(21) Appl. No.: 18/376,077

(22) Filed: Oct. 3, 2023

(65) Prior Publication Data

US 2025/0108268 A1 Apr. 3, 2025

(51) Int. Cl.

| | |
|---|---|
| ***A63B 39/06*** | (2006.01) |
| ***A63B 39/00*** | (2006.01) |
| ***B29D 22/04*** | (2006.01) |
| *B29K 23/00* | (2006.01) |
| *B29K 25/00* | (2006.01) |

(52) U.S. Cl.

CPC .............. *A63B 39/06* (2013.01); *B29D 22/04* (2013.01); *A63B 2039/003* (2013.01); *A63B 2209/00* (2013.01); *B29K 2023/06* (2013.01); *B29K 2023/12* (2013.01); *B29K 2025/06* (2013.01); *B29K 2995/0002* (2013.01); *B29K 2995/007* (2013.01)

(58) Field of Classification Search

CPC ... A63B 43/00; A63B 39/06; A63B 2039/003; A63B 43/06; A63B 43/002

See application file for complete search history.

(56) References Cited

U.S. PATENT DOCUMENTS

| | | | | |
|---|---|---|---|---|
| 2,020,484 A * | 11/1935 | Turner | A63B 43/06 473/570 |
| 5,236,383 A * | 8/1993 | Connelly | A63B 43/06 473/576 |
| 5,375,839 A * | 12/1994 | Pagani | A63B 43/00 473/570 |
| 5,597,432 A * | 1/1997 | Shishido | B29D 22/04 156/170 |
| 5,700,211 A * | 12/1997 | Mackie | A63B 43/00 473/613 |
| 5,779,575 A | 7/1998 | Hsieh | |
| 6,012,997 A | 1/2000 | Mason | |
| 6,261,400 B1 * | 7/2001 | Kennedy, III | A63B 45/00 264/516 |
| 7,247,107 B1 * | 7/2007 | Bedwell | A63B 37/12 473/595 |
| 9,592,426 B1 * | 3/2017 | DiPietro | A63B 37/0056 |

(Continued)

FOREIGN PATENT DOCUMENTS

| | | | |
|---|---|---|---|
| KR | 20170011565 A * | 2/2017 | |
| WO | WO-2012126442 A1 * | 9/2012 | A63B 37/0098 |

OTHER PUBLICATIONS

"Kraiburg-TPV", <https://www.kraiburg-tpe.com/en/what-are-tpv-thermoplastic-vulcanizates>, retrieved on May 16, 2025, dated May 29, 2023. (Year: 2023).*

*Primary Examiner* — Steven B Wong

(57) ABSTRACT

A noise-dampening ball for use in the game of pickleball is disclosed. The ball includes a novel layering arrangement which reduces noise generated during play without the need for a player to utilize an alternative paddle while falling within the size and weight standards established by the official body which oversees the sport. The ball demonstrates standard bounce characteristics while allowing the play to be undertaken without the level of noise currently experienced by pickleball players utilizing a conventional ball.

16 Claims, 5 Drawing Sheets

(56) References Cited

U.S. PATENT DOCUMENTS

| | | | | |
|---|---|---|---|---|
| D799,613 | S | 10/2017 | Dillon | |
| D800,236 | S | 10/2017 | Dillon | |
| 9,844,703 | B1 * | 12/2017 | Gupta | A01K 15/025 |
| 11,078,348 | B2 * | 8/2021 | Hyodo | A63B 39/02 |
| 11,491,374 | B1 * | 11/2022 | Newcomb | A63B 43/06 |
| 11,559,725 | B1 * | 1/2023 | Ayal | A63B 43/06 |
| 11,679,306 | B1 * | 6/2023 | Newcomb | A63B 43/06 473/570 |
| D996,540 | S | 8/2023 | Kowalski | |
| 2002/0193178 | A1 * | 12/2002 | Saiz | A63B 37/0056 473/355 |
| 2003/0199343 | A1 * | 10/2003 | Ilcisin | A63B 43/06 473/570 |
| 2005/0176532 | A1 * | 8/2005 | Thorington | A63B 43/04 473/595 |
| 2007/0032320 | A1 * | 2/2007 | Laliberty | A63B 41/08 473/604 |
| 2007/0225094 | A1 * | 9/2007 | Nix | A63B 41/08 473/605 |
| 2007/0281811 | A1 * | 12/2007 | Wang | A63B 43/06 473/570 |
| 2008/0099994 | A1 * | 5/2008 | Tuttle | A63F 7/00 273/280 |
| 2008/0287218 | A1 * | 11/2008 | Freund | A63B 69/00 473/377 |
| 2009/0137350 | A1 * | 5/2009 | Lenig | A63B 39/00 434/247 |
| 2011/0275463 | A1 * | 11/2011 | Lim | A63B 39/00 473/613 |
| 2013/0296085 | A1 * | 11/2013 | Parenti | A63B 39/00 473/611 |
| 2014/0274465 | A1 * | 9/2014 | Francis | A63B 39/00 473/613 |
| 2017/0065856 | A1 * | 3/2017 | Lin | A63B 69/0002 |
| 2017/0208776 | A1 * | 7/2017 | Ma | A01K 15/025 |
| 2017/0354850 | A1 * | 12/2017 | Chen | A63B 43/002 |
| 2018/0070560 | A1 * | 3/2018 | Gelardi, II | A63B 43/00 |
| 2019/0133079 | A1 * | 5/2019 | Jang | A01K 15/025 |
| 2020/0353318 | A1 * | 11/2020 | Tsutsumi | A63B 24/0003 |
| 2023/0201672 | A1 | 6/2023 | You | |
| 2024/0189668 | A1 * | 6/2024 | Franceschelli | A63B 45/00 |

* cited by examiner

PICKLEBALL HAVING NOISE DAMPENING CHARACTERISTICS

TECHNICAL FIELD

The disclosed invention relates generally to balls for playing pickleball. More particularly, the disclosed invention relates to a ball for use in playing pickleball which has noise dampening characteristics. The ball includes a plurality of layers which provide a durable ball being of a size which may be used in official play.

BACKGROUND OF THE INVENTION

The game of pickleball has been known since the mid-1960s. Originally the game was played with a wiffle ball. Today, the ball used in play is very different from its earliest iteration and now is a game-specific ball which is formed from a hard plastic so as to endure the paddle impacts experienced during the game. The impact of the hard plastic ball against the hard racket (between about 15 MPH and 45 MPH) is the action which creates noise found by many to be unwelcome. The noise generated during play can be considerable and has even resulted in neighborhood construction controversies where courts for pickleball games have been established.

Known pickleballs also suffer from a durability problem despite being produced from a hard material. Today's pickleballs begin to lose their shape as well as their bounce after as few as four games.

Accordingly, it is an object of the present invention to reduce the level of noise created when the pickleball contacts the paddle or the playing surface without impairing the feeling to the player generated when the ball impacts the paddle or the court surface.

It is a further object of the present invention to provide a ball for use in the game of pickleball which is relatively durable and which demonstrates a relatively long life.

As in so many areas of technology, there is room for advancement in the art of balls for use in pickleball.

SUMMARY OF THE INVENTION

The disclosed ball is adapted to reduce audible output for both or either the indoor and the outdoor pickleball ball. The ball includes a standard structural core produced from a plastic or resin with a sound changing polymer material attached which overcoats the core. A coating is applied to the substrate to reduce the level of noise generated by known pickleballs.

Optionally, the ball may have a luminescent type finish that will have a glow-in-the-dark appearance for low level light conditions.

Other advantages and features of the embodiments of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiment illustrated in greater detail in the accompanying drawings and described below by way of examples of the invention wherein.

DETAILED DESCRIPTION OF THE PREFERRED EMBODIMENT

Figure 1:
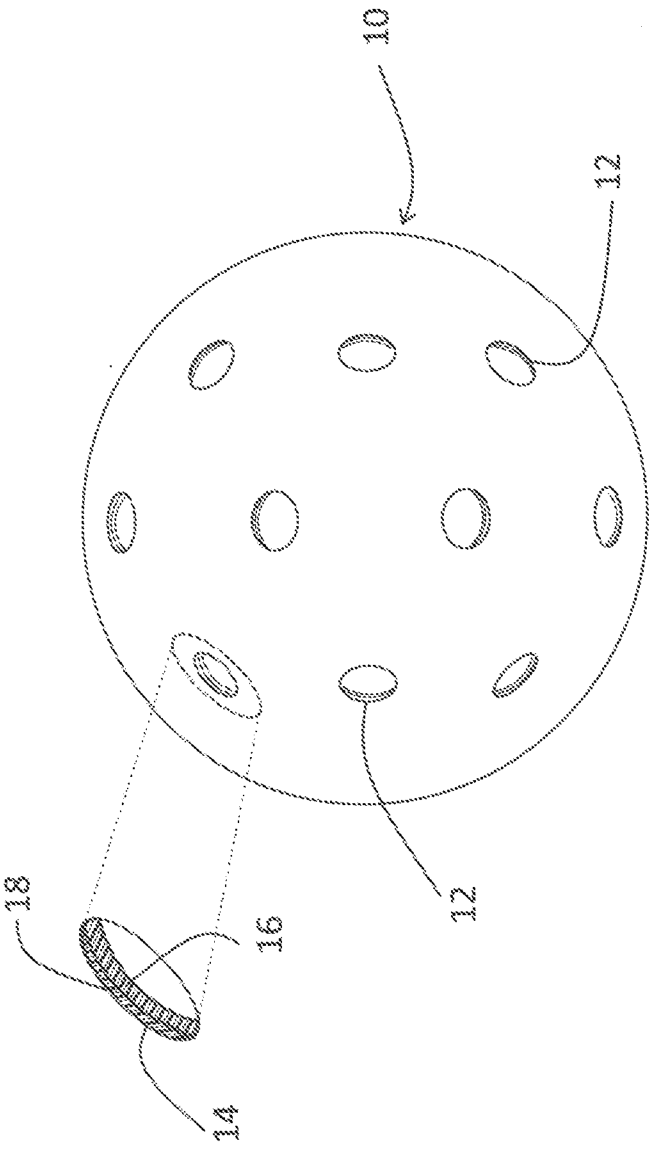
FIG. 1 is a front elevational view of the invention illustrating a detailed view of one of the holes to provide details of the layering of the ball.

In the following figures, the same reference numerals will be used to refer to the same components. In the following description, various operating parameters and components are described for one constructed embodiment. These specific parameters and components are included as examples and are not meant to be limiting.

Pickleball specifications have been established by the national governing body which oversees the sport, USA Pickleball (USAP), formerly the United States of America Pickleball Association (USAPA). According to the established specifications, the regulation diameter is between 2.874 inches (7.30 cm) and 2.972 inches (7.55 cm) while the regulation circumference is between 9.029 inches (22.93 cm) and 9.337 inches (23.72 cm). The pickleball of the disclosed inventive embodiment falls within the specified dimensions, thus the pickleball of the present invention qualifies for professional use in addition to daily use by the amateur.

With respect to pickleball weight, according to the established specifications of the USAP, a pickleball must weigh between 0.78 oz (22.11 g) and 0.935 oz (26.51 g). The reason for the relatively significant weight difference is that lighter pickleballs are generally used for indoor play while heavier pickleballs are generally used for outdoor play. However, rules have yet to be established regulating which weight ball is to be used in which play environment. The pickleball of the disclosed inventive embodiment falls within the specified weight range, thus the pickleball of the present invention qualifies for professional use in addition to daily use by the amateur.

Referring to FIG. 1, a front elevational view of a pickleball according to the present invention is illustrated generally as 10. The pickleball 10 is illustrated having a number of holes 12 formed therein to slow its speed during play, consistent with the purpose of holes in the conventional wiffleball. A greater or lesser number of holes 12 may be formed in different places as the number and placement shown are only for illustrative purposes.

One of the holes 12, a hole 14, is illustrated in detail with the detailed view being elevated above the surface of the pickleball 10. As illustrated in detail in the hole 14, the pickleball 10 includes a core 16. The core 16 is composed of a hard plastic, the type of which is known but can vary depending on the intended use. A typical choice of plastic is polypropylene which provides a durable and rigid core 16, resistant to loss of performance and shape. The core 16 may alternatively be formed from polystyrene or polyethylene.

Over the core 16 is formed an outer layer or external cover 18. The external cover 18 may be made of a variety of materials suitable for the purpose, but is preferably though not exclusively formed from a one of the thermoplastic elastomeric polymers, such as thermoplastic vulcanizates (TPVs), most typically composed of a polypropylene and a durable synthetic rubber such as ethylene propylene diene terpolymer (EPDM) which is vulcanized inside the polypropylene matrix. This composition provides superior compression resistance without compromising durability.

Because of the addition of the external cover 18, the outer diameter of the core 16 is less than the standard size. The reduced size may be achieved either through the initial molding of a smaller diameter ball or by reducing the outer surface of a standard ball by known mechanical or chemical processes. Accordingly, the addition of the external cover 18 brings the overall diameter to a value within the size restrictions recognized for professional play without exceeding the value. Similarly, the addition of the external cover 18 does not cause the overall weight of the pickleball 10 to exceed weight restrictions recognized for professional play as a portion of the outside of the core 16 has been removed.

Figure 2:
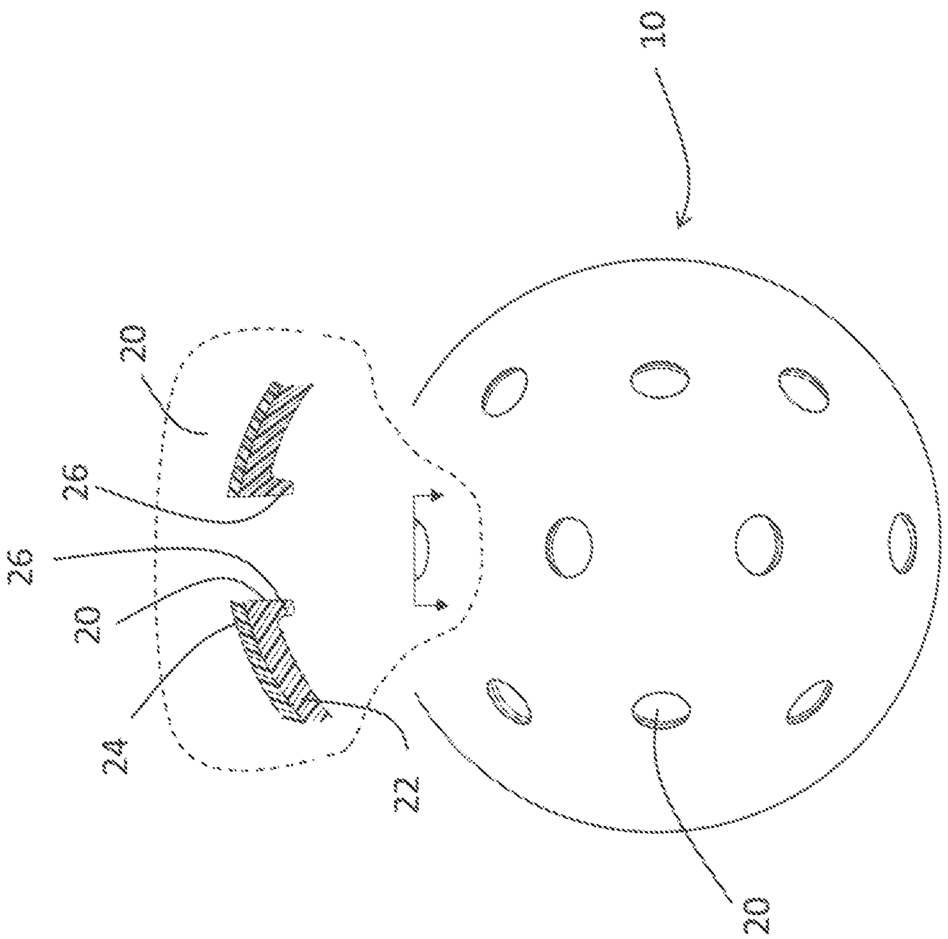
FIG. 2 is a front elevational view similar to that of FIG. 1 but showing an expanded view of a single hole to provide construction details according to a first embodiment of the invention.

Referring to FIG. 2 which is a front elevational view similar to that of FIG. 1, the construction of a hole 20 formed in the ball 10' is illustrated in sectional view. According to the illustrated embodiment, the hole 20 is formed from the molding of a core 22 and an external cover 24 which are preferably though not absolutely formed from the same material of the core 16 and the external cover 18 of the embodiment illustrated in FIG. 1 and discussed in conjunction therewith. As illustrated in FIG. 2, the area of the core 22 adjacent the hole 20 includes a walled perimeter 26 which is formed as part of the molding process.

Figure 3:
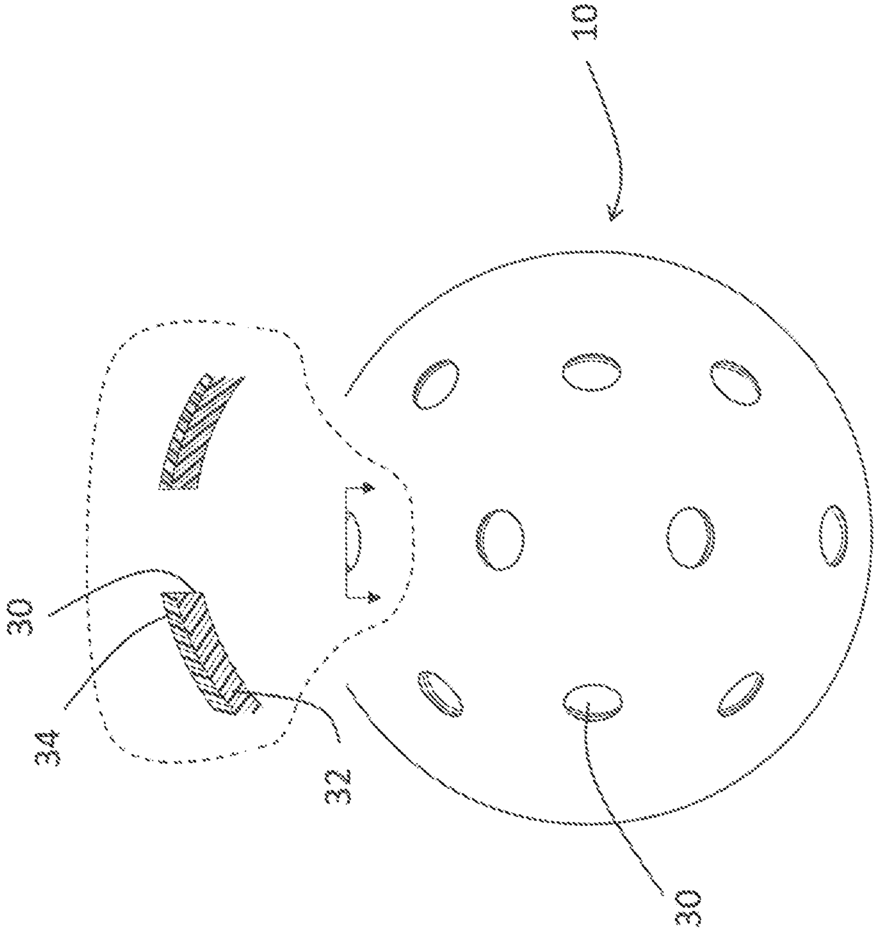
FIG. 3 is a front elevational view also similar to that of FIG. 1 but showing an expanded view of a single hole to provide construction details according to a second embodiment of the invention.

Referring to FIG. 3 which is a front elevational view similar to that of FIG. 1, the construction of a hole 30 formed in the ball 10" is illustrated in sectional view. According to the illustrated embodiment, the hole 30 is formed by drilling simultaneously through a combined core 32 and external cover 34, formed either by co-molding or by layering.

Figure 4:
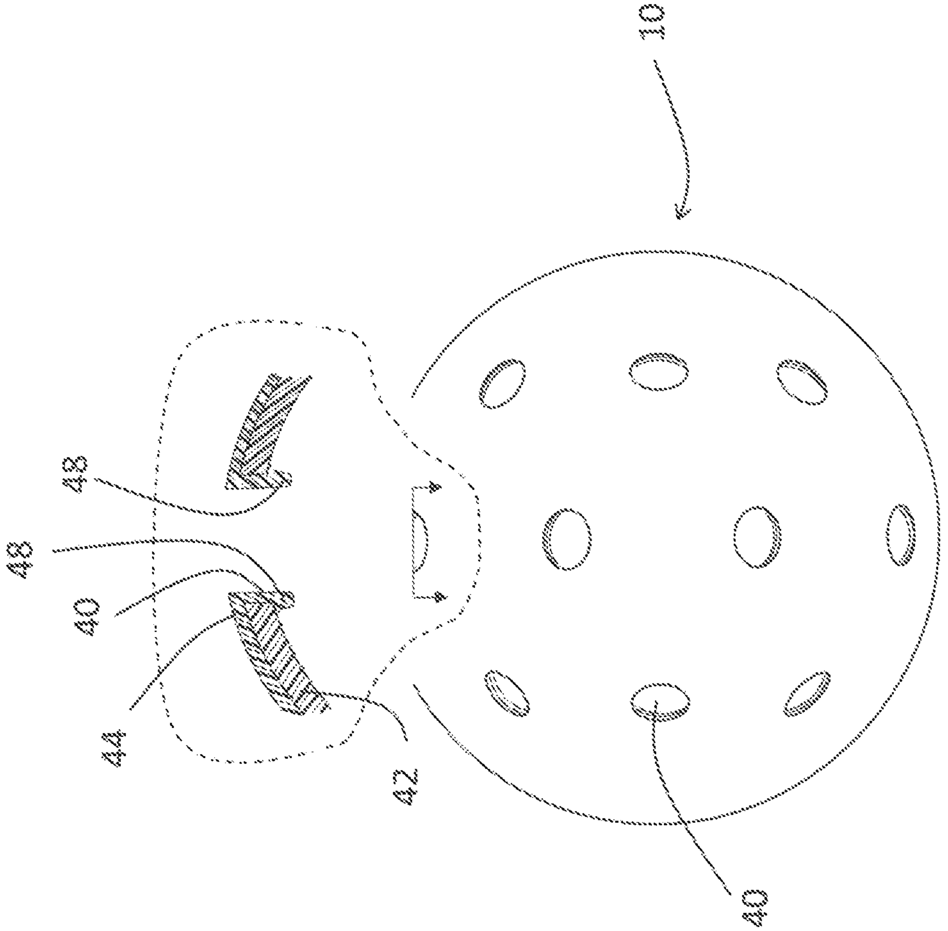
FIG. 4 is a front elevational view also similar to that of FIG. 1 but showing an expanded view of a single hole to provide construction details according to a third embodiment of the invention.

Referring to FIG. 4 which is a front elevational view similar to that of FIG. 1, the construction of a hole 40 formed in the ball 10'" is illustrated in sectional view. According to the illustrated embodiment, the hole 40 is formed from the molding of a core 42 and an external cover 44 which are preferably though not absolutely formed from the same material of the core 16 and the external cover 18 of the embodiment illustrated in FIG. 1 and discussed in conjunction therewith. As illustrated in FIG. 4, the area of the core 42 adjacent the hole 40 includes a walled perimeter 46 having a lip 48 which is formed as part of the molding process and which overlays a portion of the inner-facing wall of the core 42.

Figure 5:
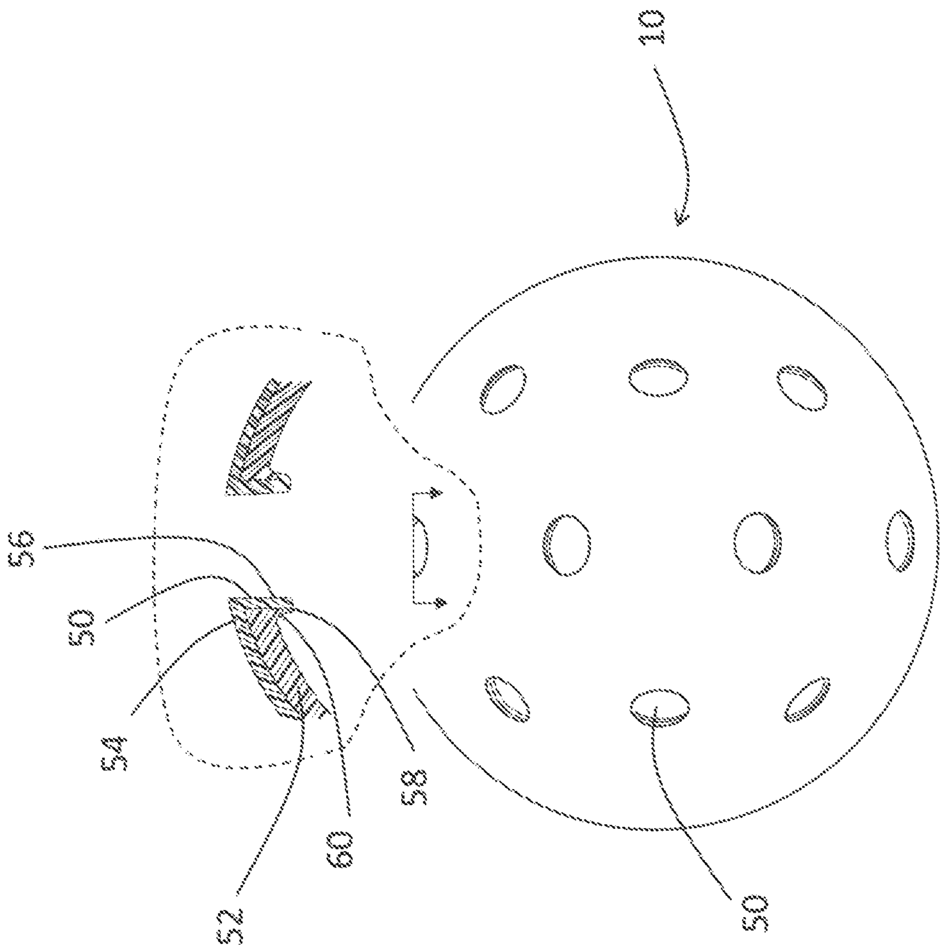
FIG. 5 is a front elevational view similar to that of FIG. 1 but showing an expanded view of a single hole to provide construction details according to a fourth embodiment of the invention.

Referring to FIG. 5 which is a front elevational view similar to that of FIG. 1, the construction of a hole 50 formed in the ball 10"" is illustrated in sectional view. According to the illustrated embodiment, the hole 50 is formed from the molding of a core 52 and an external cover 54 which are preferably though not absolutely formed from the same material of the core 16 and the external cover 18 of the embodiment illustrated in FIG. 1 and discussed in conjunction therewith. As illustrated in FIG. 5, the area of the core 52 adjacent the hole 50 includes a walled perimeter 56 having a lip 58 which is formed as part of the molding process and which overlays and interlocks with a lip 60 formed on the core 52.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention.

I claim:

1. A sound-deadening pickleball for use on a playing surface, the pickleball comprising:

a core composed of a first material, the first material being a molded material, the first material having a degree of hardness;

an external cover composed of a second material formed over the core, the second material having a degree of hardness, the degree of hardness of the first material being greater than that of the degree of hardness of the second material, the second material being composed of a polypropylene and a durable synthetic rubber composition, the synthetic rubber being vulcanized; and one or more holes formed through the core and the external cover, wherein a portion of the core adjacent at least one of the one or more holes includes a lip extending ball-inward.

2. The sound-deadening pickleball of claim 1, wherein at least one of the one or more holes includes a lip portion extending from the external cover and over a portion of the core.

3. The sound-deadening pickleball of claim 1, wherein at least one of the one or more holes includes a lip portion adjacent the hole and wherein the external cover includes a lip portion adjacent the hole, the lip portion of the external cover overlapping at least a portion of the lip formed on the core.

4. The sound-deadening pickleball of claim 1, wherein the first material is a rigid plastic.

5. The sound-deadening pickleball of claim 4, wherein the rigid plastic is selected from the group consisting of polypropylene, polystyrene, and polyethylene.

6. The sound-deadening pickleball of claim 1, wherein the second material is a thermoplastic elastomeric polymer.

7. The sound-deadening pickleball of claim 1, wherein the synthetic rubber is ethylene propylene diene terpolymer.

8. A sound-deadening pickleball for use on a playing surface, the pickleball comprising:

a core composed of a rigid plastic;

an external cover being formed over the core, the cover being composed of a polypropylene and a durable synthetic rubber composition, the synthetic rubber being vulcanized; and one or more holes formed through the core and the external cover, wherein a portion of the core adjacent at least one of the one or more holes includes a lip extending ball-inward.

9. The sound-deadening pickleball of claim 8, wherein the rigid plastic is selected from the group consisting of polypropylene, polystyrene, and polyethylene.

10. The sound-deadening pickleball of claim 8, wherein the elastomeric polymer is a thermoplastic elastomeric polymer.

11. The sound-deadening pickleball of claim 8, wherein the synthetic rubber is ethylene propylene diene terpolymer.

12. A method of constructing a pickleball, the method comprising:

forming an inner core from a first material having a hardness;

forming an external layer over the inner core, the external layer being composed of a second material, the second material having a hardness, the hardness of the first material being greater than the hardness of the second material, the second material being composed of a polypropylene and a durable synthetic rubber composition, the synthetic rubber being vulcanized; and forming at least one hole through the external layer and the inner core by molding or by drilling, wherein a portion of the inner core adjacent the at least one hole includes a lip extending inward of the pickleball.

13. The method of constructing a pickleball of claim 12, wherein the first material is a rigid plastic.

14. The method of constructing a pickleball of claim 13, wherein the rigid plastic is selected from the group consisting of polypropylene, polystyrene, and polyethylene.

15. The method of constructing a pickleball of claim 12, wherein the second material is a thermoplastic elastomeric polymer.

16. The method of constructing a pickleball of claim 12, wherein the synthetic rubber is ethylene propylene diene terpolymer.

* * * * *